United States Patent Office 2,821,441
Patented Jan. 28, 1958

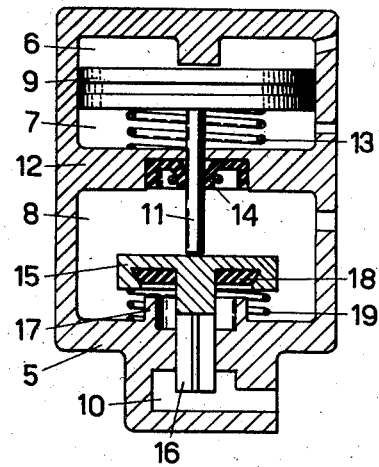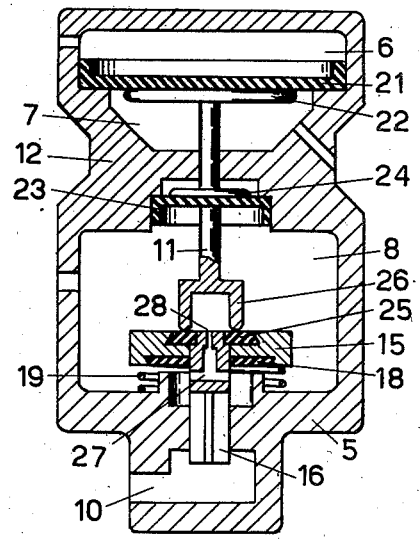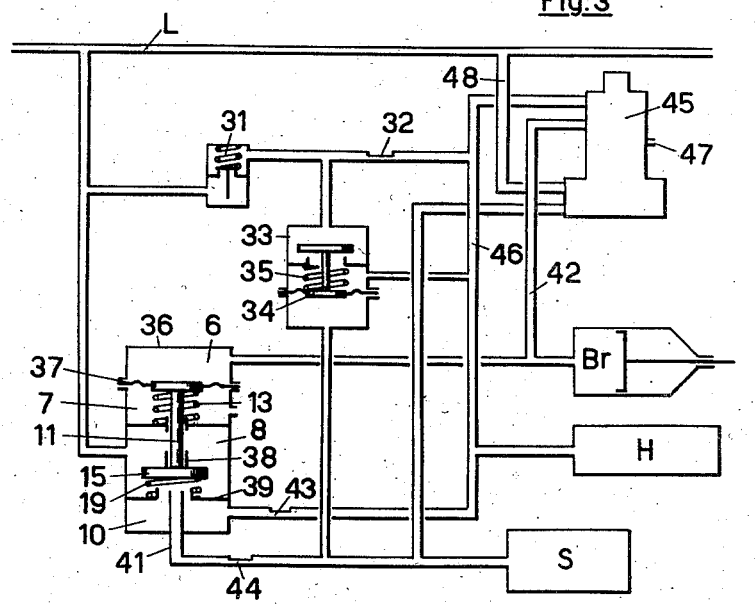

2,821,441

BRAKE CONTROL DEVICE

Siegfried Keller, Effretikon, Switzerland, assignor to Machine Tool Works Oerlikon, Administration Company, Zurich-Oerlikon, Switzerland, a company of Switzerland Application July 2, 1954, Serial No. 441,065

Claims priority, application Switzerland July 4, 1953

6 Claims. (Cl. 303—60)

The invention relates to a device on an indirectly acting compressed air brake for the control of the filling of a container, in which a normally open valve connecting the brake pipe with the container is provided, the valve body of which in the closed condition is actuated by the pressure in the brake-pipe in the sense of closing, and by the pressure in the said container on the other hand in the sense of opening, and which is adapted to be operated by an additional operating member in one sense only, said additional operating member being subject to the opposing of the pressure in the brake cylinder and of an auxiliary force.

Devices of this kind are known and will be referred to hereinafter for brevity as "devices of the kind described."

Devices of the kind described close the said container at the beginning of a braking action under the influence of the increasing brake cylinder pressure, and allow, after the reduction of the said brake cylinder pressure during the release of the brakes by the aid of a filling impulse, to keep the said container further on isolated from the brake pipe under the action of the brake pipe pressure increased beyond the ordinary operating pressure. Thereby any overcharging of the containers at the head of train can be effectively counteracted, where the brake pipe pressure upon releasing of the brakes quickly rises to the pressure of the filling impulse.

In control devices of the kind described which have become known hitherto, the valve body of the valve connecting the brake pipe with the container is subject to the action of two opposing springs, of which the spring acting in the sense of opening is stronger than the counteracting spring, in order to keep the valve normally open; then the brake cylinder pressure counteracts the stronger spring and overrides its action on the valve during the braking action. If this device has to keep the container isolated from the brake pipe even when the excess pressure in the brake pipe generated by the filling impulse is small, i. e. in the brakes of the middle portion of the train, two springs are required which differ but little from one another as regards their strength.

On the other hand, the spring acting on the valve body in the sense of closing must be comparatively strong, in order to keep the valve closed during an emergency braking when the valve body is loaded by the pressure in the container only, which acts to open the valve. Accordingly two comparatively strong springs result, which differ but little in their strength. This requires, in turn, very narrow production tolerances which have the effect of increasing the production costs.

The invention has the principal object of providing a control device of the kind described, wherein the aforesaid difficulty is obviated.

With this and other objects in view, I provide a device of the kind described wherein the operating member is actuated by the brake cylinder pressure in the sense of closing the valve in order to keep the valve closed during the braking operation while the aforesaid auxiliary force makes the valve body independent from said operating member, when the brake cylinder pressure drops below a predetermined value, and moreover the valve body is subject to a further auxiliary force acting in the sense of opening the valve, in order to open the valve during a filling impulse upon a decrease of the brake pipe pressure down to a value exceeding the pressure in the container by a predetermined amount.

A preferred embodiment of such a device comprises in combination with a brake pipe, a brake cylinder and an air container, a valve, a first biasing member biasing the said valve towards its normal open position connecting the said brake pipe to the said air container, the said valve in its closed position being subject to the pressure in the said brake pipe in the sense of being kept closed and to the pressure in the said air container in the sense of being opened, an additional operating member in unidirectional contact with the said valve in the sense of closing the same, and a second biasing member biasing the said additional operating member away from the said valve, the said additional operating member being subject to the pressure in the said brake cylinder in the sense of closing the said valve.

Further objects and features of my invention will become apparent from the following description of some embodiments thereof given by way of example with reference to the accompanying drawing, in which:

Fig. 1 diagrammatically shows the general arrangement of a device of the kind described, incorporating one embodiment of the control device according to the present invention.

Fig. 2 shows another embodiment of the said control device in longitudinal section, on a larger scale, and Fig. 3 shows a third embodiment in a representation corresponding to that of Fig. 2, the embodiment according to Fig. 2 being suitable for being substituted for the embodiment of the control device shown in the general arrangement according to Fig. 1.

Referring first to Fig. 1, the auxiliary air container H is connected to the train pipe L by two alternative paths: one of them leads from the brake pipe L over the non-return valve 31 and from there either over the restricted orifice 32 or through a feeder valve, generally denoted 33, to the said auxiliary air container H. The said feeder valve 33 is operated by a membrane piston 34 subject to the action of the pressure difference between a control air container S and the said auxiliary air container H, a spring 35 biasing the valve normally into the closed position. The constant pressure of the control air container S loads the membrane 34 in the opening of the valve 33.

The other path for filling the container H leads from the brake pipe L into the chamber 8 of a control device, denoted in general 36. This control device has a membrane piston 37 to which is connected a push rod 11 extending into the said chamber 8. The said membrane piston 37 separates a chamber 7 of said control device, which is open to the ambient atmosphere, from a chamber 6 which is in communication with the brake cylinder Br, and which is biased upward by a spring 13. On the end of the said push rod 11 a valve body 15 is guided slidably in a sleeve 38. The valve body 15 is normally biased upward by a spring 19, towards the said push rod 11. Below the said valve body 15, on a partition wall 39 a first valve seat is formed which leads to a chamber 10 and a second valve seat is formed concentrically within the said first seat by the end of a pipe 41 which is connected to the said control air container S through a restricted orifice 44.

The chamber 10 is connected through another restricted orifice 43, which determines the sensitivity of the distributor valve 45, to a pipe leading to the said auxiliary air container H. When the valve 15 is open, the said chamber 8 is therefore in communication through the chamber 10 and the said restricted orifice 43 with the auxiliary air container H, and through pipe 41 and the restricted orifice 44 with the control air container S.

The brake cylinder Br is connected through the pipe 42 to the triple valve 45, while the auxiliary air container H is connected thereto through the pipe 46. A bore 47 serves for the venting of the brake cylinder Br during the releasing action. Moreover the triple valve 45 is in communication with the brake pipe L through the pipe 48 and with the control air container S through the pipe 49.

The manner of operation of the arrangement according to Fig. 1 is as follows:

When the pressure in the brake pipe L is lowered for the purpose of initiating a braking action, in the triple valve 45 the communication of the brake cylinder Br with the outer atmosphere is interrupted which up to then had been existing through the bore 47, and connection between the pipes 42 and 46 which up to then had been interrupted, is established; the brake cylinder Br is accordingly filled from the auxiliary air container H in the usual manner, the pressure in the brake cylinder being then transmitted to the said chamber 6 of the control device 36, and forcing the valve body 15 on its double seat through the intermediary of the membrane 37, and push rod 11, against the bias of spring 13. The connection of the brake pipe L through the said control device 36 to the two containers S and H, respectively, is thereby cut off. The feeder valve 33 opens under the influence of the pressure difference between the control air container S and the auxiliary air container H arising at the beginning of the brake application. The non-return valve 31 prevents a discharge of the auxiliary air container H towards the brake pipe L.

As soon as the pressure in the brake pipe L has risen beyond that in the auxiliary air container H during the release of the brakes, this container is filled through the said feeder valve 33, until its pressure lies merely a small amount, which corresponds to the force of spring 35, below the pressure prevailing in the control air container S. The feeder valve 33 then closes under the action of this spring so that the auxiliary air container H is further charged merely through the restricted orifice 32.

The rise of pressure in the brakepipe L establishes furthermore in the triple valve 45 a communication between the pipe 42 and the bore 47, so that the brake cylinder Br is vented.

The communication through the feeder valve 33 is so selected that the time required for the filling of the auxiliary air container H conforms with the time for releasing the brake at a pressure in the brake pipe L corresponding to the operating pressure. When, however, the engine driver applies a filling impulse of a higher pressure, the filling of the said auxiliary air container is effected more speedily. Consequently the feeder valve 33 closes already before the completion of the releasing process, and any further filling takes place through the restricted bore 32.

After the pressure in the brake cylinder Br has dropped to a low magnitude, the push rod 11 of the control device 36 goes up under the action of the spring 13, and thereby releases the valve body 15. Owing to the filling impulse in the brake pipe L however, the latter is still kept pressed on to its seat, so that the communication from the brake pipe L through the control device 36 to the two containers H and S is still kept interrupted. Only after the termination of the filling impulse this communication is opened by the action of the spring 19. Thereby cross section areas are available to the two containers H and S in their flow connection with the brake pipe which are large in comparison with that of the restricted orifice 32.

In the coaches at the front end of a train accordingly, upon applying a filling impulse for the release of the brakes, firstly a large cross section area is available for the quick recharging of the auxiliary air container H through the feeder valve 33, and subsequently a reduced cross section area for the continued slow filling through the restricted orifice 32, and after the termination of the filling impulse again a larger cross section area through the control device 36. The said restricted orifice 32 serves for preventing any overloading of the brake pipe. The re-charging of the empty containers takes place exclusively through the said restricted orifice 32, since the feeder valve 33 is closed when the pressures in the two containers H and S are equal.

Referring now to Figs. 2 and 3, the same reference numerals are used as in Fig. 1 for those components which are equivalent to those in Fig. 1.

In the modified embodiment according to Fig. 2 of the control device generally denoted 36 in Fig. 1 four chambers 6, 7, 8 and 10 are provided in a casing 5, of which the first chamber 6 is in communication with the brake cylinder (not shown in Fig. 2), the second chamber 7 is open to the ambient atmosphere; the third chamber 8 is connected to the brake pipe L (likewise not shown in Fig. 2) and the fourth chamber 10 is connected to a container to be filled from the said brake pipe, such as the auxiliary air container H or control air container S of Fig. 1 (likewise not shown in Fig. 2).

The said chambers 6 and 7 are separated from one another by a piston 9 which is connected to the push rod 11 and which is biased upward by the spring 13 resting on a partition wall 12. The push rod 11 reaches through an aperture in the said partition wall 12, sealed by a gland ring 14, into the chamber 8, and bears with its end normally on the valve body 15. The latter has a projection 16 of cruciform cross section which is slidably guided in a bore of the said casing 5, leading to the chamber 10, the said projection 16 thus establishing a communication between the chambers 8 and 10 when the valve body 15 is lifted off its seat 17 on the said casing 5. The lower face of the said valve body 15 has a sealing insert 18 of rubber or the like cooperating with the said valve seat 17, and abuts on a coiled compression spring 19 which rests on the said casing 5 and keeps the said valve body 15 normally off its seat 17.

The manner of operation of the control device according to Fig. 2 is as follows:

When charging the container connected to the chamber 10, compressed air gets from the brake pipe through the chamber 8 and the valve seat 17, from which the said valve body 15 is lifted off by its spring 19, past the projection 16 into the chamber 10, whereby the pressure in the container connected to the latter rises up to the operating pressure in the brake pipe.

Upon braking, the piston 9 is forced downward by the pressure in the chamber 6 rising in conformity with the pressure in the brake cylinder, overriding the force of the springs 13, 19 and carrying along the valve body 15 as soon as the pressure in the brake cylinder reaches the small pressure required for applying the brake shoes. The valve body 15 thereby comes to rest on its seat 17, and cuts off the communication between the chambers 8 and 10. The container is thereby prevented from emptying into the brake pipe.

During the release of the brake, the piston 9 remains in its lower position which it had assumed during braking, until the pressure in the brake cylinder has dropped again to the aforesaid low magnitude. When the pressure drops further still, the force of the spring 13 suffices for shifting the piston 9 upwards. The effect of this movement on the valve body 15 consists merely in relieving the latter. The valve body is, however, shifted upward by the spring 19 then only, when the force determined by the difference of the pressures in the chambers 8 and 10 has dropped to a low magnitude. The conditions can be for example so selected that the valve is opened at a pressure in the chamber 8 exceeding that in the chamber 10 by 0.5 atm.

Upon releasing of the brake by a filling impulse substantially exceeding the operating pressure, all the containers at the head and forward portion of the train will after releasing of the brake remain isolated from the brake pipe, while in the rear portion of the train, where the pressure in the brake pipe rises slowly, the filling of the containers begins at once. The strength of the spring 19 can be selected at will within wide limits by varying the area determined by the diameter of the seat 17, since the valve is opened by this spring independently of the spring 13 after the release is effected.

In the embodiment according to Fig. 3, instead of a piston, a membrane 21 is provided which rests on a shoulder of the casing 5, the middle portion of which membrane rests on a plate 22 rigidly connected to the push rod 11. Moreover instead of the gland 14 of Fig. 2, in a recess of the casing 5 a further membrane 23 is provided, which by the pressure in the chamber 8 is forced against a plate 24 likewise rigidly connected to the push rod 11. The two membranes 21 and 23 are both so called self-sealing membranes the turned-up flanges of which are pressed tightly against the wall of the casing by the pressures prevailing in the chambers 6 and 8, respectively.

The lower end of the push rod 11 is constructed as an annular valve seat 26, which normally abuts on a sealing insert 25 on the top face of the valve body 15. The latter is guided slidably in the casing 5, as in the embodiment of Fig. 2, by means of a projection 16 of cruciform cross section, and is normally forced upward by a spring 19. In the projection 16 a bore 27 is provided which issues via a restricted orifice 28 on the top face of the valve body 15 within the valve seat 26. The chambers 6, 7, 8 and 10 are, as mentioned in connection with Fig. 2, respectively in communication with the brake cylinder, the ambient atmosphere, the brake pipe, and the container (none of which is shown in Fig. 3).

The manner of operation of the control device according to Fig. 3 is as follows:

When the brake is released and no pressure exists in the chamber 6, the push rod 11 is forced upward by means of the membrane 23 by the pressure of the brake pipe prevailing in the chamber 8, until the plate 24 abuts on the partition wall 12 of the casing 5 forming a guide for the push rod 11. The membrane thereby takes over the function of the spring 13 of Fig. 2. The valve body 15 is forced upward by the spring 19 until it abuts on the seat 26. The communication between the chambers 8 and 10 is accordingly open.

Upon braking, the membrane 21 is forced downward and carries along the push rod 11, shutting off the communication of the chambers 8 and 10 by means of the valve body 15.

During the releasing process, when in the chamber 8 an increased pressure from the brake pipe is set up, the push rod 11 is raised by means of membrane 23, as soon as the pressure in the chamber 6 has dropped sufficiently. When then in the chamber 8 a pressure exists exceeding by a certain amount the pressure in the chamber 10, the pressure in chamber 8 keeps the valve body 15 on the seat 17 against the action of the spring 19. Since the valve seat 26 does not then abut on the sealing insert 25 any more, there is now a communication established between the chambers 8 and 10 through the bores 27 and 28 through which compressed air can slowly flow or leak off from the brake pipe towards the container.

As compared with the embodiment according to Fig. 2, by this additional communication the advantage is attained, that a brake pipe, which has been overloaded by a filling impulse, can discharge itself gradually towards the containers of the individual coaches, so that the engine driver, after having returned the braking valve under his control into the driving position, can always start from the operating pressure when carrying out a braking operation.

The same effect could also be attained with a control device according to Fig. 2 by the use of a brake valve under the control of the driver, which in the driving position automatically allows excess charges of the brake pipe to flow off.

While I have hereinabove described, and illustrated in the accompanying drawing what may be considered typical and particularly useful embodiments of my invention, I wish it to be understood, that I do not limit myself to the particular details and dimensions described and illustrated, for obvious modifications will occur to a person skilled in the art.

What I claim as my invention and desire to secured by Letters Patent, is:

1. In a compressed air brake in combination with a brake pipe, an air container and a brake cylinder: a connection pipe connecting the said brake pipe to the said air container, a non-return valve and a restricted orifice arranged in series in the said connection pipe, the said non-return valve opening towards the said air container, a bypass bridging over the said restricted orifice, a feeder valve controlling the said bypass and in the open position having a cross section area available to the air flow substantially exceeding that of the said first restricted orifice, the said restricted orifice and the said feeder valve forming together a first path from the said brake pipe to the said air container, a control means having a first chamber in communication with said brake cylinder, a second chamber open to the ambient atmosphere, a third chamber in communication with the said brake pipe, a fourth chamber in communication with the said air container, a movable partition member separating the said first and second chamber, a fixed partition wall separating the said second and third chamber, a valve body in the open position connecting and in the closed position separating the said third and fourth chambers, a first biasing means biasing the said valve body towards its open position, a push rod fixedly connected to said movable partition member and tightly extending through the said fixed partition wall towards the said valve body, unidirectionally operating the same towards the closed position, and second biasing means biasing the said push rod away from the said valve body, the said control means forming a second path from the said brake pipe to the said air container in parallel to the said first path.

2. In a compressed air brake in combination with a brake pipe, an auxiliary air container, a control air container and a brake cylinder: a connection pipe connecting the said brake pipe to the said auxiliary air container, a non-return valve and a first restricted orifice arranged in series in the said connection pipe, the said non-return valve opening towards the said auxiliary air container, a feeder valve having a first compartment branched off between the said nonreturn valve and the said first restricted orifice, a second compartment branched off between said first restricted orifice and the said auxiliary air container, a third compartment in communication with the said control air container, a valve controlling the communication between the said first and second compartment, a spring biasing the said valve towards its open position, and a movable partition member fixedly connected to the said valve and separating the said second and third compartments from one another, a control means having a first chamber in communication with said brake cylinder, a second chamber open to the ambient atmosphere, a third chamber in communication with said brake pipe, and a fourth chamber in communication with the said auxiliary air container, a second restricted orifice interposed between the said fourth chamber and the said auxiliary air container, a movable partition member separating the said first and second chamber from one another, a fixed partition wall separating the said second and third chamber from one another, a valve body in the open position connecting and in the closed position separating the said third and fourth chamber from one another, a first biasing means biasing the said valve body towards its open position, a push rod fixed to the said movable partition member penetrating tightly through said fixed partition wall and unidirectionally cooperating with the said valve body in the sense of moving the same towards its closed position, and second biasing means biasing the said push rod away from the said valve body, a pipe having an inlet controlled by the said valve body and connected both to the said control air container and to the said third compartment of the said feeder valve, and a third restricted orifice interposed between the said inlet and the connection of said pipe with the said third compartment and control air container.

3. The combination claimed in claim 2, comprising in addition: a triple valve, pipes connecting the said valve to the said brake pipe, to the said auxiliary air container, to the said brake cylinder and to the said control air container, and a leak off orifice on the said valve, the said valve having a braking position establishing communication between the said brake cylinder and the said auxiliary air container and closing communication between said brake cylinder and the said leak off, and a releasing position, in which it opens the said communication between the said brake cylinder and the said leak off and closes the said brake cylinder and the said auxiliary air container.

4. In a compressed air brake in combination with a brake pipe, a brake cylinder and an air container to be filled from said brake pipe: valve means comprising a valve seat and a member forming a valve body movable relatively to said valve seat between a valve opening position and a valve closing position and normally biased to said valve opening position; actuating means for said member normally biased to a rest position and operable from said rest position under compressed air supplied by said brake cylinder; connecting means for unidirectional transmission of movement between said actuating means and said member, to move the latter from said valve opening position to said valve closing position upon operation of said actuating means by brake cylinder pressure and to leave said member unaffected by said actuating means upon a return movement of said actuating means to said rest position; two faces provided on said member, said faces in said valve closing position being loaded in opposite directions by brake pipe pressure and container pressure respectively and said brake pipe pressure acting to press said valve body on said valve seat to keep said valve means closed independently of said actuating means upon the existence of a brake pipe pressure exceeding the container pressure by a predetermined amount.

5. In a compressed air brake in combination with a brake pipe, a brake cylinder, and an air container to be filled from said brake pipe: valve means connecting said brake pipe with said air container to control the filling of the latter comprising a valve seat and a member forming a valve body movable relatively to said valve seat between a valve opening position and a valve closing position and normally biased to said valve opening position; actuating means for said member normally biased to a rest position and operable from said rest position under compressed air supplied by said brake cylinder; connecting means for unidirectional transmission of movement between said actuating means and said member to move the latter from said valve opening position to said valve closing position upon operation of said actuating means by brake cylinder pressure and to leave said member unaffected by said actuating means upon a return movement of said actuating means to said rest position; two faces provided on said member, said faces in said valve closing position being loaded in opposite directions by brake pipe pressure and container pressure respectively, said brake pipe pressure acting to press said valve body on said valve seat to keep said valve means closed independently of said actuating means upon the existence of a brake pipe pressure exceeding the container pressure by a predetermined amount; a normally closed feeder valve for said air container connecting the latter with said brake pipe; actuating means for said feeder valve connected with said air container; and pneumatic loading means for the last named actuating means to cause the latter to open said feeder valve dependent on the opposing effects of the pressure in said air container and of said loading means upon a pressure drop in said air container.

6. In a compressed air brake in combination with a brake pipe, a brake cylinder and an air container to be filled from said brake pipe: valve means comprising a valve seat and a member forming a valve body movable relatively to said valve seat between a valve opening position and a valve closing position and normally biased to said valve opening position; actuating means for said member normally biased to a rest position and operable from said rest position under compressed air supplied by said brake cylinder; connecting means for unidirectional transmission of movement between said actuating means and said member, to move the latter from said valve opening position to said valve closing position upon operation of said actuating means by brake cylinder pressure and to leave said member unaffected by said actuating means upon a return movement of said actuating means to said rest position; two faces provided on said member, said faces in said valve closing position being loaded in opposite directions by brake pipe pressure and container pressure respectively and said brake pipe pressure acting to press said valve body on said valve seat to keep said valve means closed independently of said actuating means upon the existence of a brake pipe pressure exceeding the container pressure by a predetermined amount, a restricted orifice provided in said member, additional valve means for controlling said orifice, said additional valve means comprising a valve seat provided on said member and a valve body provided on said connecting means to provide for a delayed filling of said air container through said orifice when said actuating means are in said rest position and the first named valve means are closed.

References Cited in the file of this patent

UNITED STATES PATENTS

| | | |
|---|---|---|
| 1,614,653 | Christensen | Jan. 18, 1927 |
| 2,066,404 | Kasantzeff | Jan. 5, 1937 |
| 2,273,944 | Farmer | Feb. 24, 1942 |
| 2,545,512 | Campbell | Mar. 20, 1951 |
| 2,661,248 | Keller | Dec. 1, 1953 |